(12) United States Patent
Allen et al.

(10) Patent No.: US 11,729,584 B2
(45) Date of Patent: Aug. 15, 2023

(54) ON-DEMAND CREATION OF CONTEXTUALLY RELEVANT AND LOCATION-AWARE EPHEMERAL SERVICES

(71) Applicant: Cisco Technology, Inc., San Jose, CA (US)

(72) Inventors: Julie Allen, Sioux Falls, SD (US); Fernando Molina Rodriguez, Fresno, CA (US); Andi Bridgett Cho, Discovery Bay, CA (US); Matthew L. Sommer, Millington, MI (US); Gonzalo Salgueiro, Raleigh, NC (US); Pascale Delaunay, La Verne, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/350,567

(22) Filed: Jun. 17, 2021

(65) Prior Publication Data
US 2022/0408217 A1    Dec. 22, 2022

(51) Int. Cl.
H04W 4/02     (2018.01)
H04W 4/029    (2018.01)
(Continued)

(52) U.S. Cl.
CPC .......... *H04W 4/029* (2018.02); *H04W 4/021* (2013.01); *H04W 4/023* (2013.01); *H04W 4/20* (2013.01); *H04W 4/70* (2018.02)

(58) Field of Classification Search
CPC ....... H04W 4/029; H04W 4/70; H04W 4/021; H04W 4/023; H04W 4/20
See application file for complete search history.

(56) References Cited

U.S. PATENT DOCUMENTS 9,483,770 B2 * 11/2016 Watfa ................ G06Q 30/02
10,831,824 B1 * 11/2020 Ilic .......................... H04L 51/52
(Continued)

OTHER PUBLICATIONS

Bryan Bedford et al., "The Future of Live Entertainment: How 5G and Wi-Fi 6 Are Changing the Game", The Wall Street Journal, retrieved from Internet Jun. 17, 2021, 4 pages; https://partners.wsj.com/cisco/powering-an-inclusive-future/the-future-of-live-entertainment-how-5g-and-wi-fi-6-are-changing-the-game/.

(Continued)

*Primary Examiner* — Dai Phuong
(74) *Attorney, Agent, or Firm* — Edell, Shapiro & Finnan, LLC

(57) ABSTRACT

Techniques are for provided located-based contextual services to users by automatically creating location-based contextually relevant communication sessions that may take on a variety of forms, including contextual chats and micro-local services that are ephemeral, curated by a location owner and personalized by a user. As a user's context shifts throughout the day (from work to shopping to entertainment, etc.) the presented techniques filter content differently based on what the user may care about at a particular moment when the user is at a particular venue. The automatic creation and deletion of an ephemeral space/channel provides a dynamic application that changes its content or behavior based on a user's location. The user may control the interactivity level based on an adaptive user identifier by which a user's identity may take on different versions depending on location and time of day.

20 Claims, 13 Drawing Sheets

(51) Int. Cl.
*H04W 4/70* (2018.01)
*H04W 4/20* (2018.01)
*H04W 4/021* (2018.01)

(56) References Cited

U.S. PATENT DOCUMENTS

| | | |
|---|---|---|
| 2003/0007464 A1 | 1/2003 | Balani |
| 2013/0198039 A1* | 8/2013 | Sridharan .......... G06Q 30/0613 |
| | | 705/26.44 |
| 2014/0019552 A1 | 1/2014 | Oh |
| 2015/0172227 A1* | 6/2015 | Grove, II ............ H04L 12/1813 |
| | | 709/206 |
| 2015/0193543 A1 | 7/2015 | Poliakov et al. |
| 2016/0066144 A1 | 3/2016 | Weis et al. |
| 2016/0094592 A1* | 3/2016 | Koch ...................... H04L 67/51 |
| | | 709/204 |
| 2016/0381501 A1 | 12/2016 | Ballezzi et al. |
| 2020/0125218 A1* | 4/2020 | Bender ................... H04L 51/04 |
| 2020/0177699 A1* | 6/2020 | Podduturi .......... G06Q 30/0269 |
| 2021/0360018 A1* | 11/2021 | D'Agostino ........ H04L 63/1425 |
| 2022/0343751 A1* | 10/2022 | Carr, Jr. .................. H04W 4/06 |

OTHER PUBLICATIONS

Naman Kapur, "Geo-fencing in Push Notifications: The Next Step in User Engagement", ShepHertz, May 5, 2016, 3 pages.
MacRumors, "iOS 14 Might Allow Users to Partially Interact With Apps Without Installing Them", Apr. 9, 2020, 10 pages.

\* cited by examiner

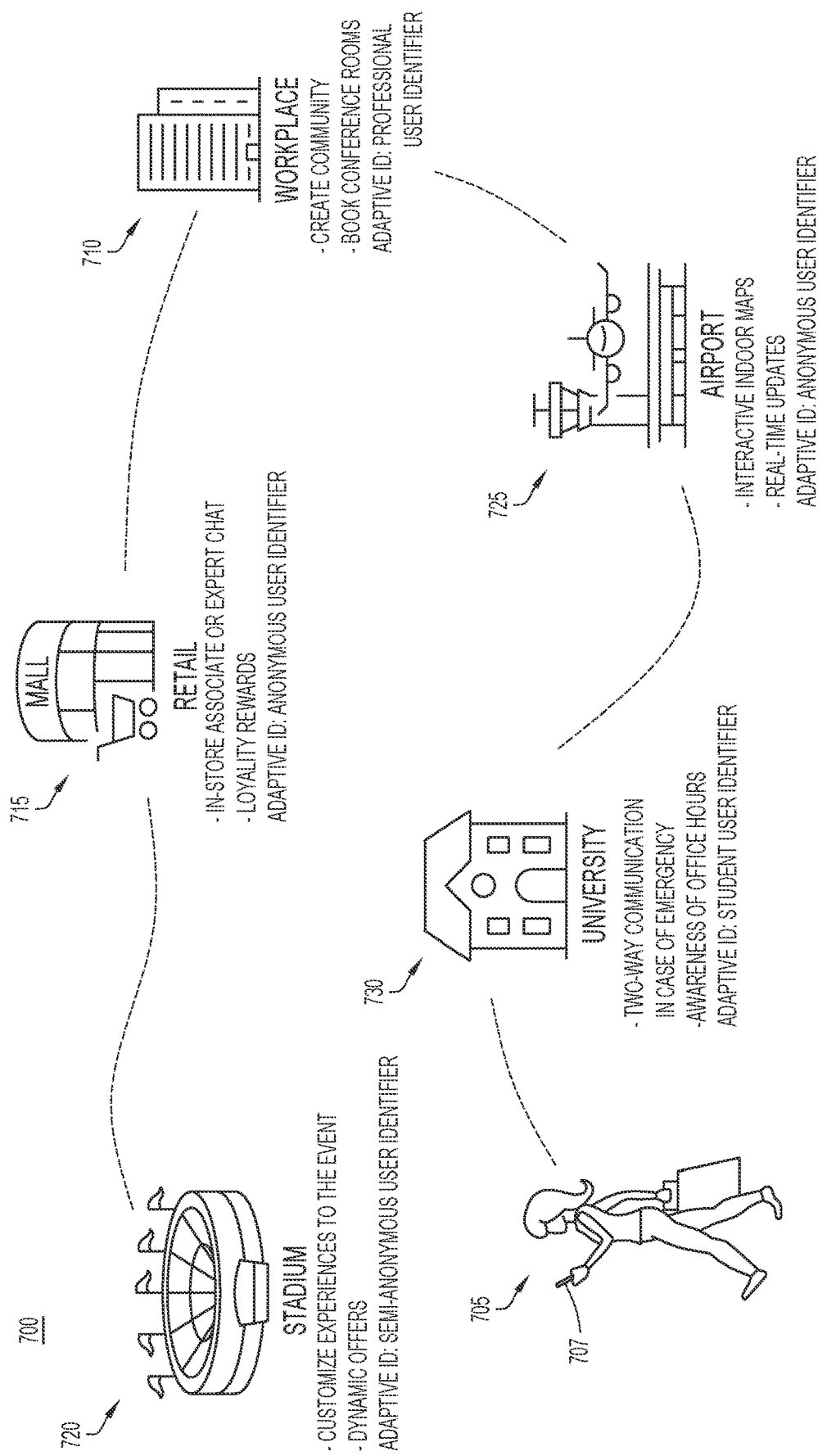

ON-DEMAND CREATION OF CONTEXTUALLY RELEVANT AND LOCATION-AWARE EPHEMERAL SERVICES

TECHNICAL FIELD

The present disclosure relates to collaboration services.

BACKGROUND

The internet makes the whole world accessible. But sometimes it is not about engaging with the whole world, but rather the need to interact with the here and now. The people here. The location services available now.

The challenge is for a given user to know which of the innumerable web experiences around him that could enhance what the user is currently doing in a way relevant to him, such as maps for indoors, augmented reality (AR) interactions, restroom availability, digital offers, donations, etc. The further challenge is to easily access these available experiences, without needing to have numerous applications to be installed on a user device.

There is a category of user applications (apps) that are often considered junk, such as venue apps, restaurant ordering apps, retail apps, etc. Many users do not bother downloading them. And even when they are downloaded, it is often for a one-time use, then immediately deleted by the user.

The content source/venue owners have invested in the digital services in order to keep up with virtual world and they want all that actionable analytics. However, the bar is high to earn a coveted spot on a user's smartphone or similar daily use device. The app needs to deliver an exceptional experience in addition to providing on-going value beyond a one-time use.

BRIEF DESCRIPTION OF THE DRAWINGS

FIG. 7 is a diagram that depicts how the location-aware context for a user may change and how a different user identifier may be used for a user as the user moves to different locations/venues, according to an example embodiment.

DESCRIPTION OF EXAMPLE EMBODIMENTS

Overview

Figure 1:
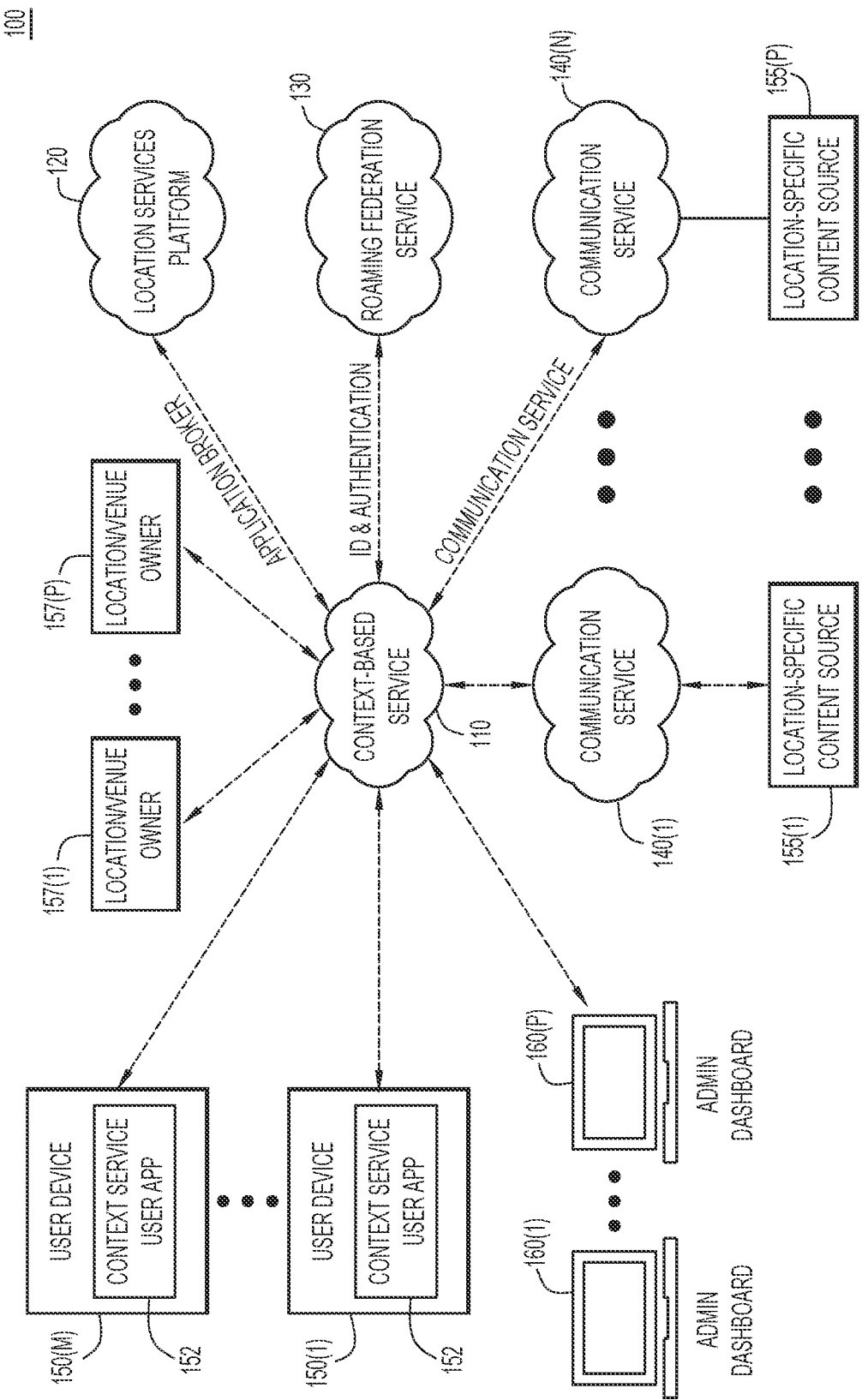
FIG. 1 is a block diagram of a system for providing on-demand creation of contextually relevant and location-aware ephemeral communication services, according to an example embodiment.

Presented herein are techniques for provided located-based contextual services to users. In one embodiment, a method is provided that includes storing user configuration information. The user configuration information indicates, for one or more users of a plurality of users, a plurality of user identifiers each of which is associated with a respective user of the one or more users, and settings that determine which user identifier of the plurality of user identifiers is displayed on behalf of the respective user in communication sessions on behalf of one or more location/venue entities according to a geographic location of a mobile device associated with the respective user and/or time of day of the communication sessions. The method further includes obtaining information about a geographic location of the mobile device of a first user of the plurality of users; correlating the geographic location of the mobile device of the first user with the one or more location/venue entities; joining the first user to a particular communication session based on the correlating; and causing to be displayed, on behalf of the first user, in the particular communication session to which the first user is joined, one of the plurality of user identifiers for the first user according to the user configuration information for the first user.

EXAMPLE EMBODIMENTS

A system and associated methods are presented herein for the automatic creation of a location-based contextually relevant communication sessions that may take on a variety of forms, including contextual chats and micro-local services that are ephemeral, curated by the location owner and are as personalized as the user allows.

By separating the relevant location-aware functionality from the location venue's application (app) and accessing third-party location-based app slice capabilities, these techniques streamline access to relevant location-based services by eliminating the friction of first finding, then downloading multiple apps. Thus, these techniques may be seen as a simplified and technically more efficient way to access web experiences orbiting in the digital sphere around a person, place, virtual space or object at the current/relevant time.

The world of online services are aware of user's context. The user and the location/content source owner are the beneficiaries of that awareness in a way that the user (and content owners) prefer and control. The techniques presented herein use methodologies to prioritize and automatically deliver the location-based services established from the user's preferences and permissions as well as the curation of the location/venue owner that manages certain location-specific content to be provided to users via various communication services.

The system and methods presented herein also enable two-way communication services and full interactivity based on a user's location. Those communication services are displayed in a universal framework, not by an isolated ecosystem based on a device.

Reference is now made to FIG. 1. FIG. 1 is a high-level diagram of a system 100 according to an example embodiment. The system 100 includes a context-based service 110 that interfaces with a location services platform 120, roaming federation services 130 and one or more communication services 140(1)-140(N). The context-based service 110 is in communication with user devices 150(1)-150(M), each of which includes a context service user app 152 installed thereon. It is through this context service user app 152 that a user can set user preferences that the context-based service 110 uses to control how sessions with any of the communication services 140(1)-140(N) are provided to a user. Thus, a single app on a user device is used to provide the app functionality that is relevant to the user in a specific location/setting, at a specific time.

The context-based service 110 uses the location of a user, derived from a location of a corresponding user device, e.g., one of the user devices 150(1)-150(M), to provide relevant services to a user. By first being location-aware, the context-based service 110 manages and coordinates communication sessions provided by one or more of the communication services 140(1)-140(N), in real-time, as those communication services have sessions available at a particular location right at a current period of time.

The communication sessions to be provided to users may be based on location-specific content sources 155(1)-155(P) that are managed by corresponding ones of the location/venue owners 157(1)-157(P). FIG. 1 shows that each location/venue owner 157(1)-157(P) may be presented with a unique administrative (admin) dashboard 160(1)-160(P) to define, via the context-based service 110, the parameters that would determine the user's experiences that are employed by the location services platform 120. Similar to how location owners control their physical environments, by using the location services platform 120, the location owners may curate the contextual micro-services to be offered to users via user devices 150(1)-150(M). This allows the locations/venues to customize user experiences to specific events and area zones.

The location services platform 120 may serve as the administrative backend for zone segmentation. This can be configured to use geo-fencing based on Wi-Fi® wireless local area network (WLAN) access points, Bluetooth® beacons, Li-Fi, and a wide area wireless network (mobile communication network), e.g., Fourth Generation (4G), 5G, and beyond) precision positioning.

This interaction with a communication session provided by one or more of the communication services 140(1)-140(N) is automatic for the user. The input to trigger the contextual content is to simply the user, with his user device, entering a geographical location, physically or virtually. Once triggered and verified, notifications or icons begin downloading and populating a dashboard of the context service user app 152, instantly ready for the user to select in order to launch or participate in a communication service for a curated experience at that location.

The roaming federation services 130 may be a platform such as the OpenRoaming™ federation service, which delivers automatic Wi-Fi and contextual digital services to enable user devices to maintain their identity across multiple disparate wireless networks, such as multiple Wi-Fi networks. The roaming federation services 130 may automatically onboard the user and verify their identification. In addition, the context-based service 110 uses the roaming federation services 130 to trigger a service layer of functionality to populate cards with curated messaging spaces and relevant location services. The context-based service 110 will also use the roaming federation services 130 for user identification and authentication of users, as described in more detail below.

The context-based service 110 is configured to prioritize the preferences and permissions of a user, aligned with the curated digital services that have been identified by the location/venue owners 157(1)-157(P). The context-based service 110 manages a dynamic policy-based framework that is an intersection of a user's/consumer's social/interest graph (or explicitly set user preferences) and a location/venue owner's social/interest graph (or explicitly set preferences). The context-based service 110 casts out a location-feed weighting the location services based on the user's settings and the policies set by the location/venue owner around transactions, spatial chats, wayfinding, dynamic offers, AR experiences, exclusive entertainment, etc. This intersection assures the enforcement of policies that result in an optimized list of available location- and context-based services that are both curated to each user as well as abide by the available resources, operating guidelines and preferences of the location/venue owner. Once those parameters are no longer met, such as the user leaving the defined area or after a specified duration, the location-aware display of the contextual content and chat spaces disappear. Thus, the communication session may be ephemeral in nature.

Types of Communication Sessions

The communication sessions that are provided to user devices 150(1)-150(N) via the respective installed context service user app 152 may be grouped into one of several categories. For example, there may be a category of messaging/chat/video and related services.

Messaging/Chat/Video Service: 1-to-1

These type of communication sessions may involve, for example, chatting with a bot, chatting with a venue representative in the same location (with the ability to escalate to in-person, right here right, now assistance), chat with a super-agent, remote venue expert in a contact center (with ability to escalate to a video call), chat with a brand expert (e.g., user clicks on message space, scans QR code in the store, connects with brand customer service).

Messaging/Chat/Video Service: 1-to-Small Group

These type of communication sessions may involve a chat that begins as a 1:1 chat but if necessary, additional participants are added into the chat room until the initiator has the information needed. When the initiator of the chat leaves the chat space, the chat space disappears.

Messaging/Chat/Video Service: 1-to-Many

These type of communication sessions may involve a venue broadcasting out a message or display media (in a digital sign or display banner network) to those located in the zone, the venue creating and segmenting different spaces to which people may automatically be added based on location and/or preferences (e.g., a sports venue location where a user is connected into a team's fan chat space), and a crowdchat in which anyone can communicate with everyone at the venue.

Still other examples of these type of communication sessions include a "VIP" such as a performer on stage or player on the field being prioritized and moved to the top and made "stickie"—meaning they stay visible for a short amount of time, and crowd polls (e.g., "What do you want to hear for the encore song?" at a music concert).

Further examples include spectator chats (also called "fly-on-the-wall" chats) in which a user observes the chats and conversations of a closed group of people (e.g., former players as they comment on a game in real-time, and where observers may or may not be invited into the chats depending on the group, office hours event chats (e.g., coffee shop on Main in New York City, June 10 from 10-11 am, only the people there can chat with a popular artist (who is somewhere else).

First Responder Communications

In case of emergency, all access two-way communication with first responders is provided.

The following are examples of services that may be provided in the various communication sessions established with user devices.

Indoor wayfinding
Transactions/Payment
Loyalty rewards wallet
AR/VR experiences
Audio Guides
Infotainment
Gaming
Live Streaming
Advertisements/Promotions
Dynamic offers based on real time analytics
Reviews
Events nearby happening now/soon
Wait Times
Voice Recognition
Timeline (communication history)
Help
Donations
Conference Room Bookings
Parking availability
Transportation Services/shuttles pick-ups requests, arrival times
Delivery of goods to a user's location
Digital Assistant Reminders for where the user is located
Waiting Room Liaison
Location concierge The location services platform 120 provides admin dashboards for analytics and metrics for real-time location intelligence. With the addition of the context-based service and a location/venue owner having its own sort of interest/social graph, the location/venue owners can further leverage these insights. For example, an Italian restaurant in Florida can share insights with a restaurant in South Dakota, but without fear of competition. At the local level, a restaurant and all the businesses in a downtown plaza can easily stack experiences in the Nowcast feature described above.

Figure 2:
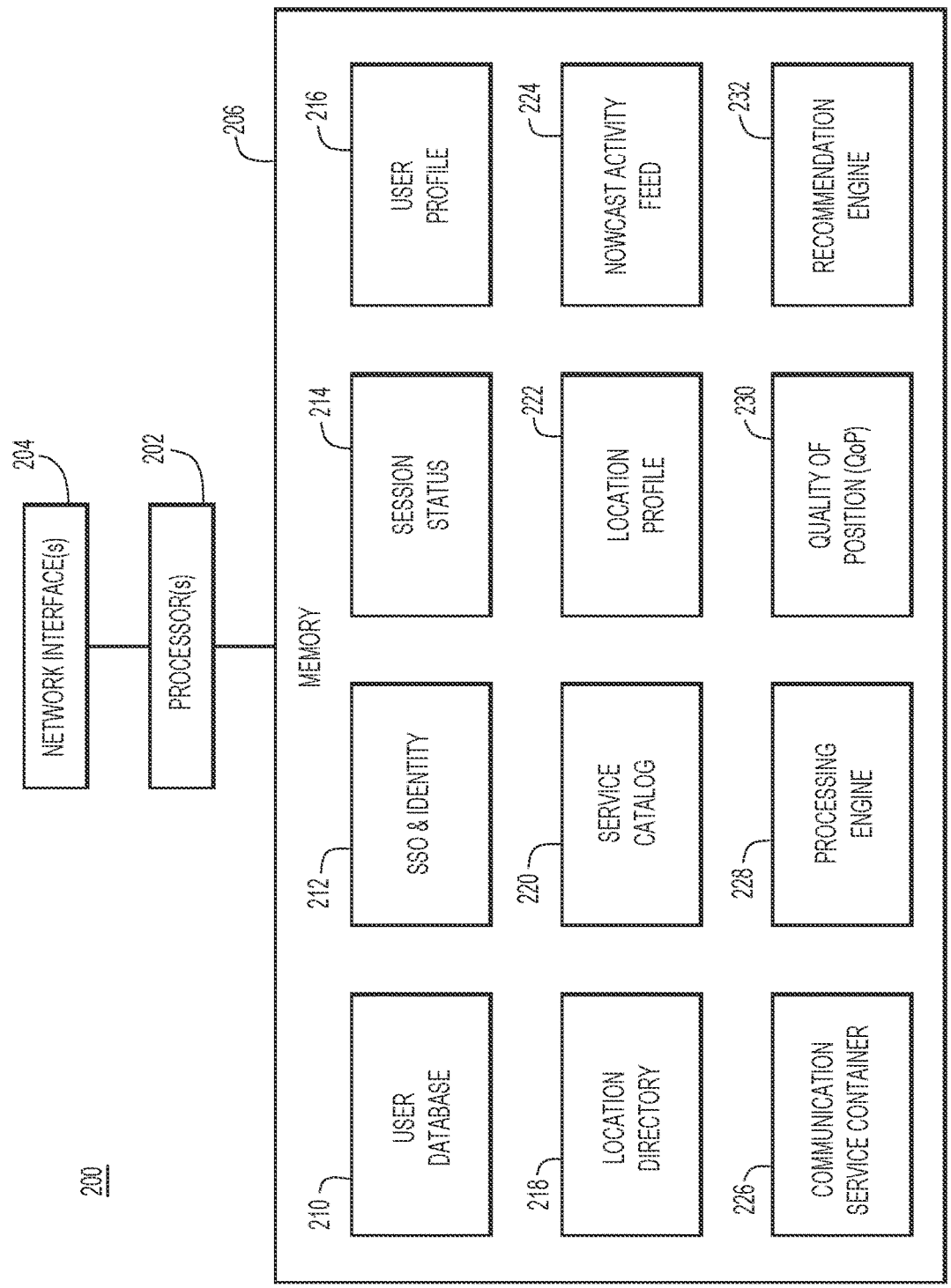
FIG. 2 is a diagram of a server configured to provide the location-aware communication services, according to an example embodiment.

Reference is now made to FIG. 2, showing a block diagram of a computing device 200 that performs the operations of the context-based service 110. The computing device 200 may a server computer that includes one or more processors 202, one or more network interfaces 204 (network interface cards or array of such network interface cards), and memory 206 that stores data or executable instructions associated with various functions or data structures that the context-based service 110 uses to perform its operations. It should be understood the processors 202 and memory 206 may be distributed and redundant, but for simplicity are shown a single blocks in FIG. 2.

The processor(s) 202 may be at least one hardware processor configured to execute various tasks, operations and/or functions for the computing device 200 as described herein according to software and/or instructions configured for computing device 200. Processor(s) 202 (e.g., a hardware processor) can execute any type of instructions associated with data to achieve the operations detailed herein. In one example, processor(s) 202 can transform an element or an article (e.g., data, information) from one state or thing to another state or thing.

There are several modules/functions of the context-based service 110 which are involved in creating contextual messaging and location-based ephemeral services that automatically come and go as a user enters and leaves a geographical location/venue. The context-based service 110 combines a variety of tools and technology for managing, filtering, viewing, aggregating, recommending, publishing, and searching location-based data and relevant user data. Together these technologies provide a syndicated feed management system which is displayed as an integrated user interface with a dynamic display acting as a location-based vessel with which to a user can interact and transact right here and now.

These software modules/functions are shown as individual blocks inside the memory 206, and include a user database 210 is a database of all registered users, single-sign-on (SSO) and identity credentials 212 that manages user authentication and identity credentials of users, session status 214 that includes information that tracks state of all live sessions with users, user profile data 216 that contains user preference/configuration information, interest graph pertaining to topical interests and services that each user desires to be notified about, a location directory 218 that contains a list of location/venue organizations subscribed to participate in the content-based service 110, a service catalog 220 that includes a list of services available at each location/venue, location profile data 222 that contains an interest graph for each location/venue organization which is matched (correlated) against user preferences for a user, a Nowcast activity feed 224 that serves as a feed of aggregated activities going at a location or in a specified range or zone associated with a location, communication service container 226 that manages ephemeral communication spaces and sessions, a processing engine 228 that processes and normalizes data, Quality of Position (QoP) data 230 that is produced using a weighted algorithm for determining user location based on physical location accuracy, speed and inertia, as well as user preferences and state of a user, and a recommendation engine 232 that may employ machine learning or other techniques to algorithmically produce recommendations based on user preferences. The location profile data 222 thus serves to store, for each of the one or more location/venue entities, configuration information associated with content to be presented to, and communication sessions to be provided for, the plurality of users based on customization and preferences set by respective location/venue entities. This allows the location/venue owner/entity to customize the experiences that they may offer to users who are at their location/venue.

Figure 3A:
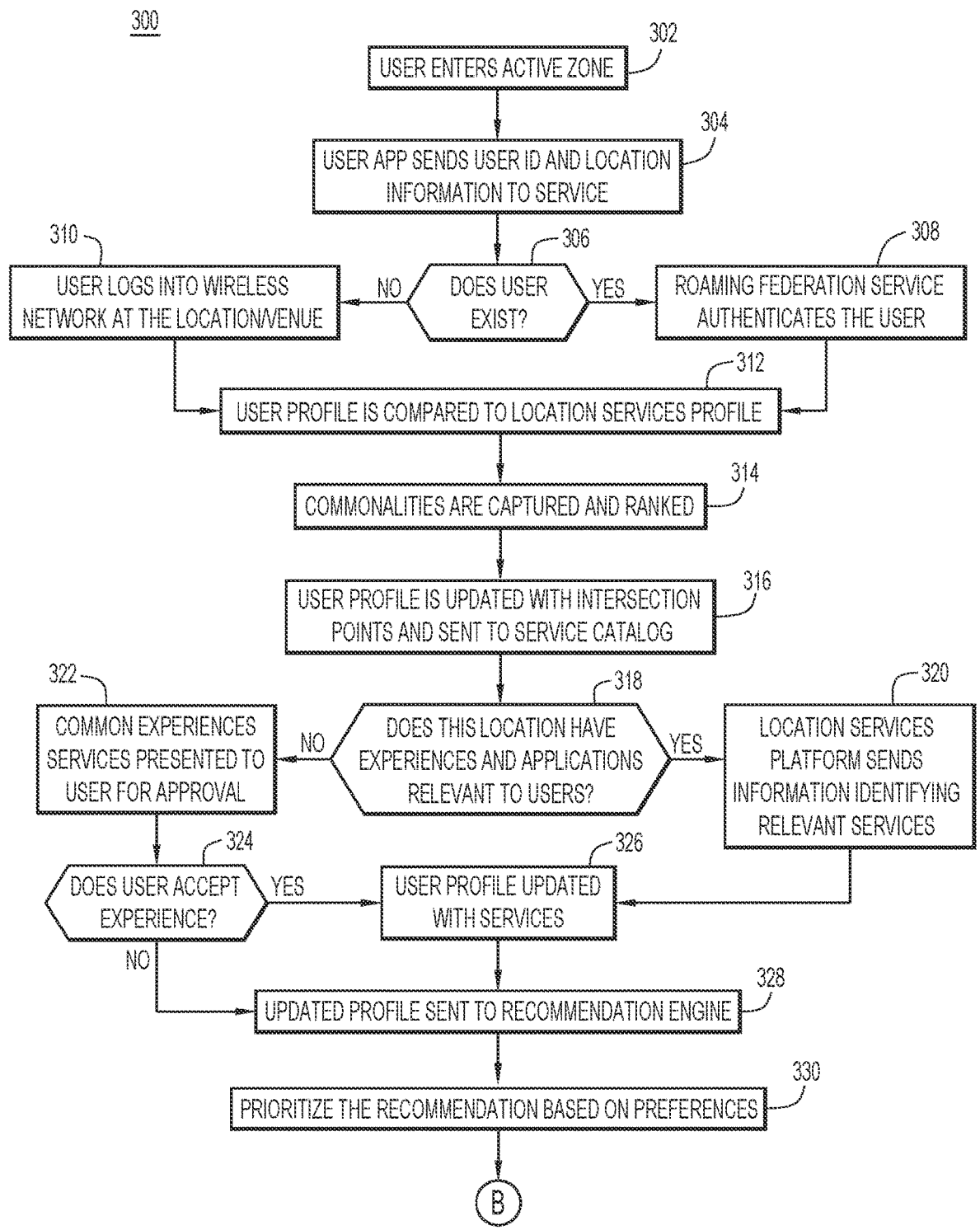
FIGS. 3A and 3B depict a flow chart of a method for providing contextually relevant and location-aware ephemeral communication services, according to an example embodiment.
Figure 3B:
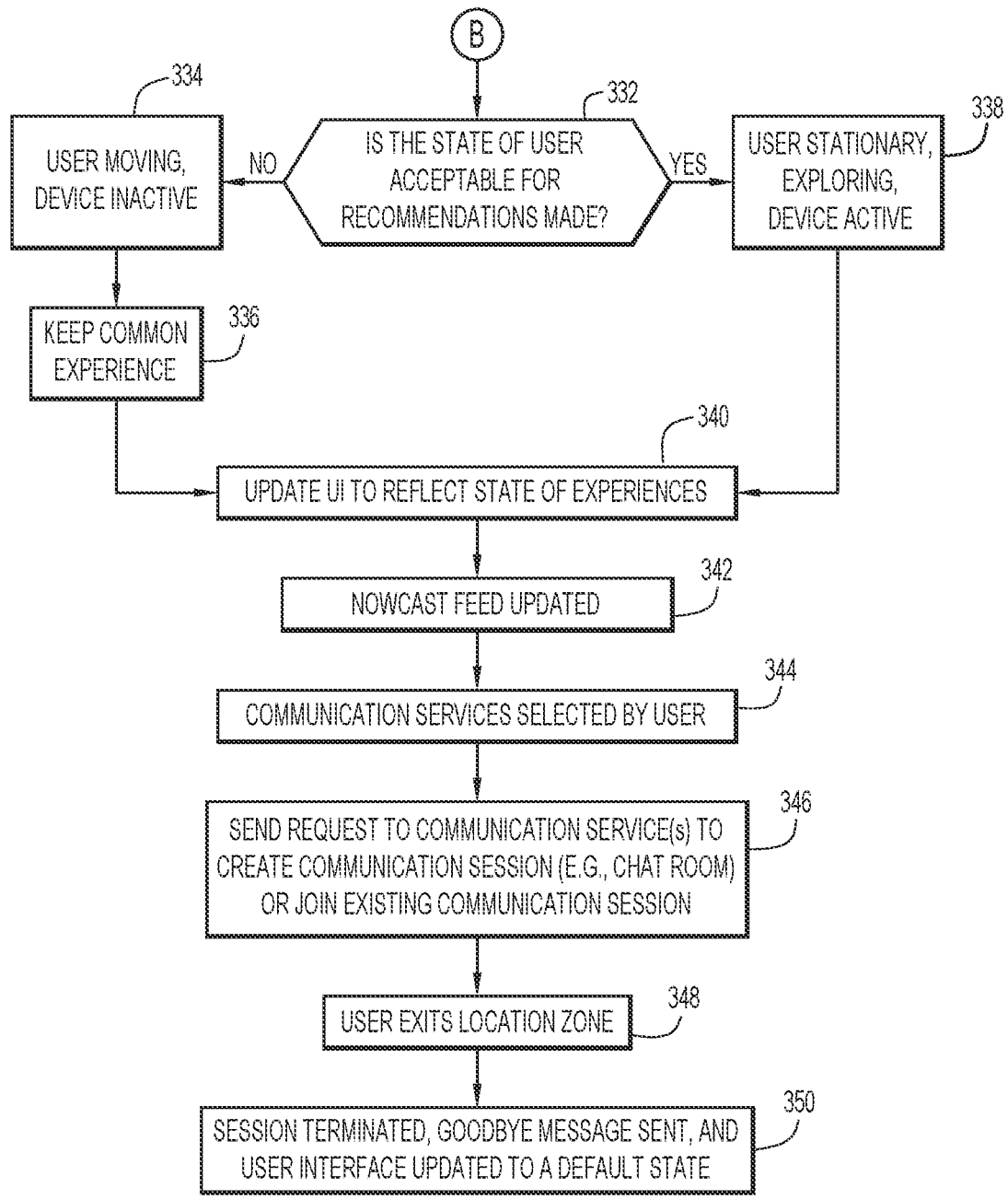

FIGS. 3A and 3B illustrate a flow chart of that depicts the overall operational process 300 of the context-based service 110 in system 100 shown in FIG. 1. Reference is also made to FIGS. 1 and 2 in connection with the description of the process 300. At 302, a user enters a location or venue. At 304, the context service user app 152 running on the user device obtains location information of the user device and sends the user identifier for the particular user and the location information to the context-based service 110.

At 306, the context-based service 110 determines whether the particular user exists in the user database 210 based on the user identifier obtained at 304. If the particular user is in the user database 210, then at 308, the roaming federation services is notified to authenticate the particular user. If the particular user is not in the user database 210, then at 310 the user logs into a wireless network (e.g., Wi-Fi network) at the location/venue. Operation 310 is employed such that if the user does not exist in the roaming federated database, the user would have the option to login or register to get onto the location network.

At 312, the context-based service 110 compares the user profile of the particular user to the location services profile. At 314, commonalities between the user profile and the location services profile are captured and ranked. In so doing, the context-based service 110 checks user preferences, subscriptions and permissions for matches for the particular user. Also, the context-based service 110 checks the location directory 218 for digital experiences available and requirements (device type, device state etc.).

At 316, the context-based service 110 updates the user profile with any intersection points determined at 314 and sends such intersection information to the service catalog 220.

At 318, the context-based service 110 determines whether the location/venue where the particular user is now located has experiences and applications relevant to users. If there are experiences and applications at this location/venue, the process 300 proceeds to 320 in which the location services platform 120 sends information identifying such experiences and applications to the context-based service 110.

If, at 318, it is determined that the location/venue does not have any experiences or applications relevant to users, then at 322, a notification is sent to the user device of the particular user about common experiences and services available for that location, for which the particular user can approve to receive/participate in such services. If there are no relevant services available at that location, no further action is taken.

At 324, it is determined whether the particular user has accepted the suggested experience/application at that location. If the user has accepted, then at 326, the user profile for the particular user is updated with the relevant services obtained at 320 or accepted at 324.

At 328, the updated user profile is sent to the recommendation engine 232 of the context-based service 110. At 330, the context-based service 110 prioritizes recommendations for the particular user based on the user preferences.

If a match of services is identified by the recommendations engine 232, a micro-service is created with location and preferences for the user. A session identifier (ID) and a tag of the session is assigned with a priority based on best match. Thus, the recommendation engine 232 performs a correlation between user preferences and location venue/owner preferences to determine one or more matches, that results in selection of one or more communication sessions. In other words, the recommendation engine 232 prioritizes preferences and permissions selected by the particular user and location demographic digital services identified by location owner, and the result is basically what is overlapping between the two sets of information. The session ID may be based on location+timestamp+user ID+device. The priority tag may be, for example, a number between 1-100 based on criteria and preferences. The correlation between geographic location of the mobile device of a user (and preferences of the user) with one or more location/venue entities drives the selection of types of communication session(s) to be presented to the user of the mobile device.

Referring now to FIG. 3B, at 332, it is determined whether the state of the particular user device is acceptable for the recommendations determined at 328 and 330. If the user device is inactive or moving, as shown at 334, then a "common" experience may be maintained for the user at 336. On the other hand, if the state of the user device is acceptable for the recommendations, such as the user device being stationary, exploring and is active, as shown at 338, the user interface (UI) on the context service user app 152 is updated to reflect the state and associated experiences/recommendations, at 340. For example, the context-based service 110 sends to the context service user app 152 an indication of the services available to the particular user, such as transactions, spatial chat, wayfinding, dynamic offers, AR experiences, exclusive entertainment, etc. Examples of user interface screens for the notifications and content that the context-based service 110 sends to the context service user app 152 are described below in connection with FIGS. 6, 8A, 8B and 9.

At 340, a haptic feedback or notification may be provided to the particular user via the context service user app 152 running on his/her user device. The context-based service 110 may send a customized dashboard to the user device, indicating the services for the current location that are available based on the tag provided for session ID. At 342, a Nowcast feed may be updated for the particular user.

At 344, the particular user selects the experience/communication services he/she desires. If the particular user is subscribed to the communication service, a determination is made as to what type of communication session is involved (1-on-1, 1-to-many, public, etc.). In one example, at operation 344, a user may be presented with a prompt on their user device to be joined to the particular communication session with an anonymous or modified user identity that does not reveal the real identity of the first user. This may be particularly useful for some "famous" users who do not want others to know that they are present at a particular location/venue, or in general, for any user who does not want his/her real identity revealed to others. Based on the prompt, the system may receive from the user a selection to join the first user to the particular communication session with the anonymous or modified user identity.

At 346, a request is sent to the communication service(s) associated with the user selections made at 344. A communication session is created based on privacy settings of the particular user. If a broadcast communication setting is enabled, the context-based service 110 searches for nearby users with matching preferences and makes them available to communicate with in the communication session. In one example, a notification to one of the communication services 140(1)-140(N) to create a chat space based on the session ID may be provided, and the particular user is invited and/or location owner participants are notified to join. The communication session (e.g., chat room or space) may already exist and the particular user is joined to that communication session, upon accepting the invitation to do so by way of a user interface action on the context service user app 152.

The context-based service 110 monitors the communication session for changes and if the session is terminated, it notifies the particular of the room closure or participant departure. For example, as shown at 348, the user may leave the particular location that triggered a particular communication session. When this happens, the context-based service 110 removes or deletes the communication session (e.g., chat space) from the user's dashboard on their user device. The particular user is thereby removed from the communication session, and in some cases, depending on the nature of the communication session, the communication session may be terminated entirely (e.g., a 1-to-1 session). This is reflective of the ephemeral nature of the communication session to which the particular user is joined.

If the particular user is subscribed to other communication services, those services are triggered and the next highest priority experience available is notified. For example, if augmented reality (AR) is available, the particular user may be directed to experience it via wayfinding. If there are pending offers for particular user, they may be presented to the particular user.

A change in session ID state (session is closed due to user departing that location) results in a dashboard closure and a goodbye message is sent, as shown at 350.

The context-based service 110 may maintain a completion flag for content that has already been consumed by the user for a communication session to prevent repetition.

The context-based service 110 maintains a Quality of Position (QoP) 230, which is a weighted QoP given to a session. The QoP may be based on physical location (accuracy of that location position), policy from location owner (zone distance and requirements), preferences for a user (explicit higher to implicit lower), and state of user (movement, static, browsing, app installed, etc.).

Figure 4:
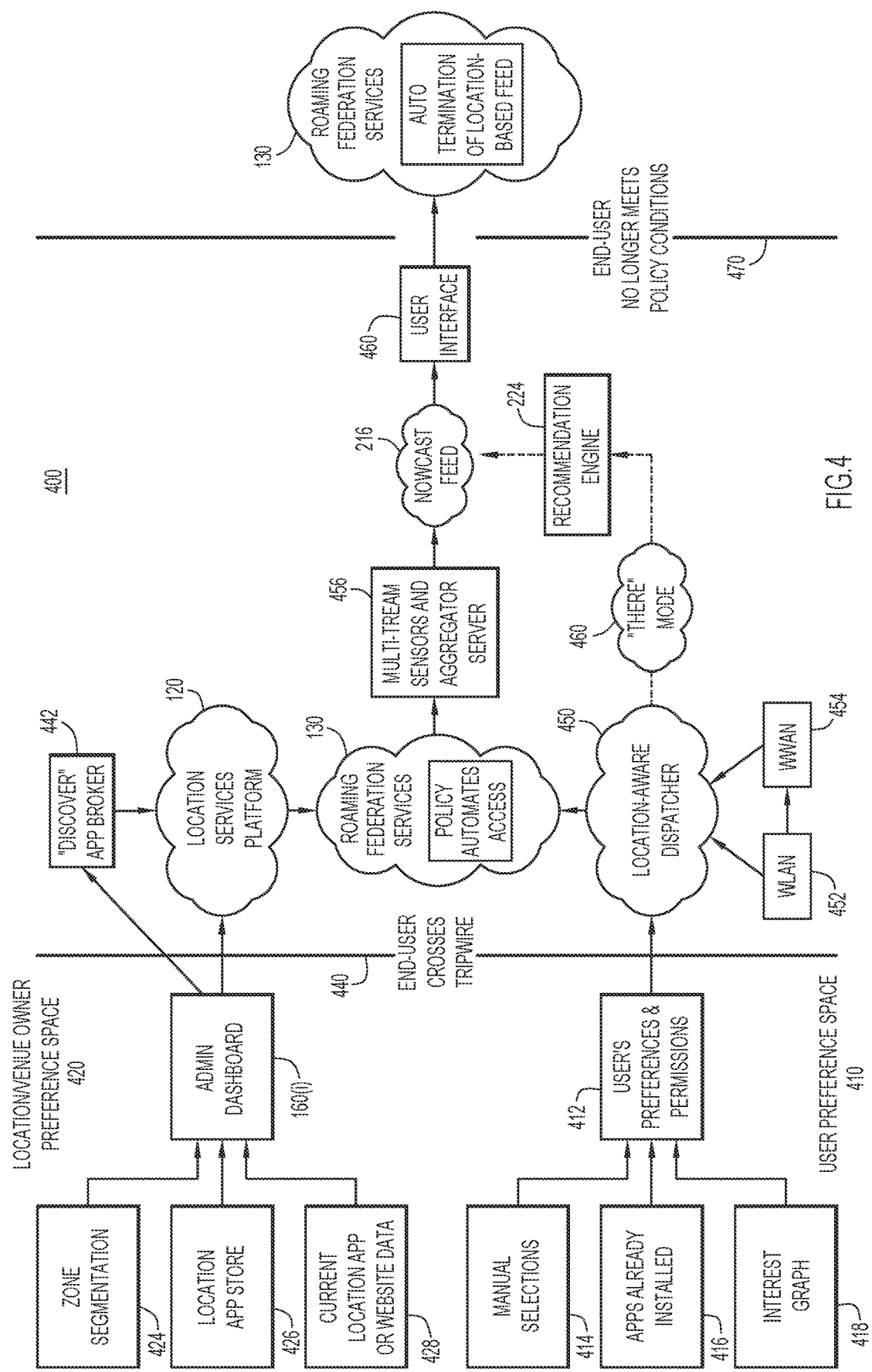
FIG. 4 is an operational flow diagram of the system depicted in FIG. 1, according to an example embodiment.

FIG. 4 is a diagram 400 that illustrates many of the operations of the context-based service 110. The context-based service 110 supports the notions of a user preference space 410 and a location/venue owner preference space 420. The user preference space 410 involves user preferences and permissions 412 established based on manual selections 414 made by the user, applications already installed on the user's device as shown at 416, and an interest graph 418 established and maintained for the user, or based on user activity by a user filling out an interest survey. The user is control of identity, privacy, and personalization.

This user preference/configuration information can be conditionally set by location, time, mood, "Adaptive ID" (described below), etc. A user is not required to set preferences but doing so enables more personalization.

Similarly, each location/venue owner may, via the admin dashboard 160(*i*), for location/venue owner i, establish criteria for how to deliver communication services to users though zone segmentation 424, a location/venue app store 426 and a current location app or website data 428. Zone segmentation 424 involves dividing certain sub-areas of a location/venue so that different services can be provided in the different sub-areas of that location/venue.

As shown at 440, a trigger occurs when a user moves to a location venue.

The admin dashboard 160(*i*) interacts with a "discover" app broker 442 and the location services platform 120. As explained above, the location services platform 120 is the administrative backend for zone segmentation.

The roaming federation services 130 may automatically onboard a user and verify their identification or an "Adaptive ID" if the user has created many alternate IDs. A user may set up their privacy settings (in the aforementioned user settings/configurations information) as to how they want to be identified on the network and what information the venues may collect on the user. An Adaptive ID is a user identifier that that can be set in the user's preferences and permissions 412. For example, an Adaptive ID may include a setting in which the user is always "anonymous in new retail settings" or always uses "Professional ID and preferences" in workplace locations, and uses an "Alter Ego ID and preferences" in public venues. A user could even set their ID based on the time of day. The Adaptive ID is described in more detail below.

A core function of the roaming federation services 130 is a federated ID trust system. This means that if one trusted identifier authenticates a user, then trust is sufficient for a particular advertiser, vendor, retailer, to automatically authenticate the user. This may be of an "all opt-in" nature and will not be shared outside of larger industry benchmarking that the location services platform 120 provides. However, the more visible the user is, the better the venues will be able to offer the user personalized services.

The context-based service 110 includes a location-aware dispatcher 450 that tracks a user's location based on wireless local area network (WLAN) connectivity 452, e.g., Wi-Fi, and/or wireless wide area network (WWAN) connectivity 454, e.g., 4G, 5G, etc.

There is a multi-stream sensors and aggregator server 456 that gathers the continuous data streams from the multiple sensors, Wi-Fi or Bluetooth beacons, robotics and Internet-of-Things (IoT) devices in the environment to improve the location experience based on the near real-time actionable analytics.

The context-based service 110 also includes a "There" mode 460 that interacts with the recommendation engine 232 to retrieve recommendations of services based on user preferences, which in turn interacts with the Nowcast feed 224. The Nowcast feed 224 provides content to a user device via a user interface running as part of the context service user app 152 on the user device.

As shown at 470, the user may no longer meet certain policy conditions that merit feeding content/services to the user. At that point, the roaming federation services 130 is notified to terminate the location-based feed to the user.

Figure 5:
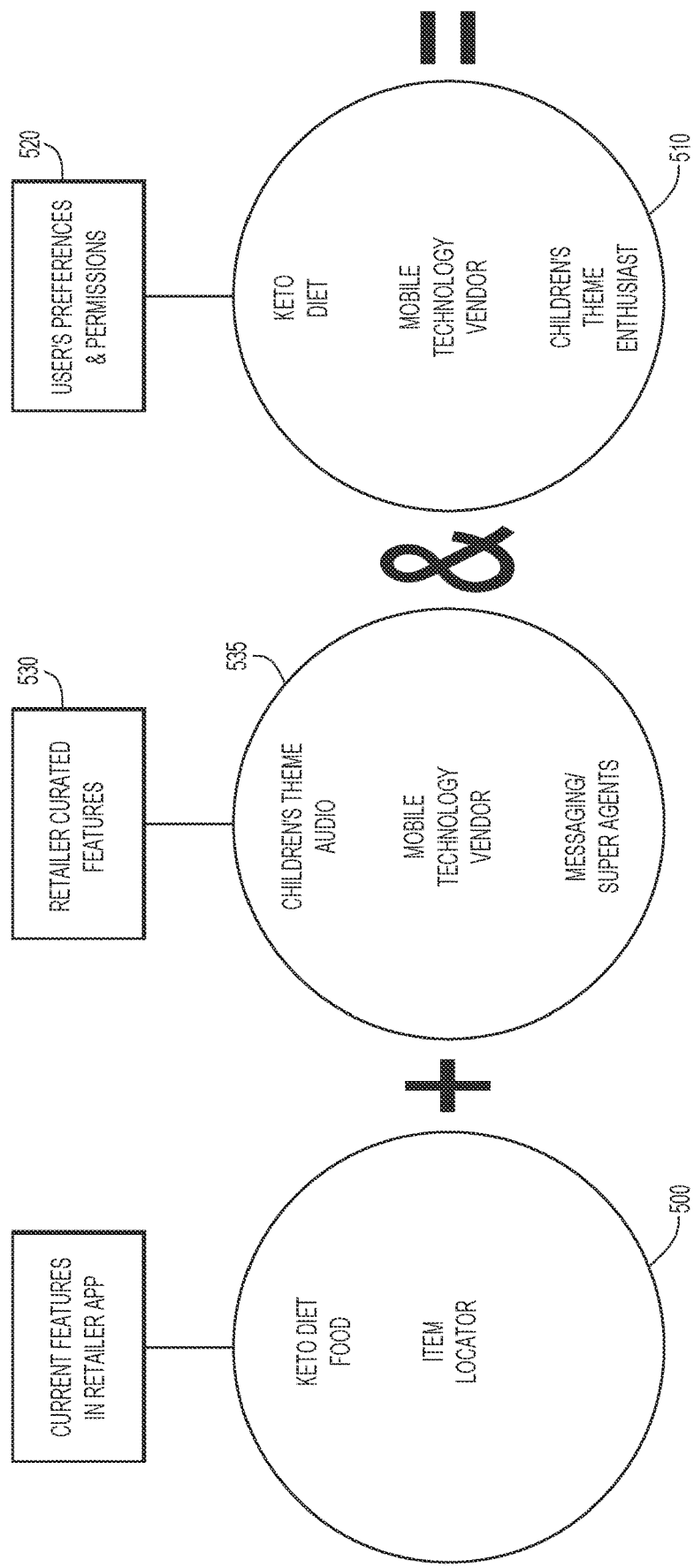
FIG. 5 is a diagram depicting how the user interactions associated with the contextually relevant and location-aware communication services may be merged into a single user application installed on a user device, according to an example embodiment.

Reference is now made to FIG. 5. FIG. 5 illustrates a use-case example of how the context-based service 110 may operate. A given user visits a particular retailer a few times a year, so she does not have a need to download the relatively large retailer app 500 on her smartphone, yet she would like to take advantage of the location-aware services of the local retailer's store. The user has interest in Keto diet food, in this example.

The user has downloaded the context service user app 510 and set up her preferences and permissions shown at 520. This user has prioritized anything Keto diet related to surface. Next, she loves a good deal and has the mobile technology vendor app on her phone, but often forgets to use it. She has also indicated that her family are children's theme enthusiasts and she enjoys AR type experiences, not through smartglasses, but through her browser on her smartphone.

In addition, the retailer has established certain curated features 530, including, as shown at 535, children's theme audio, mobile technology vendor incentives, and has messaging/chat spaces Super Agents available to assist users.

Figure 6:
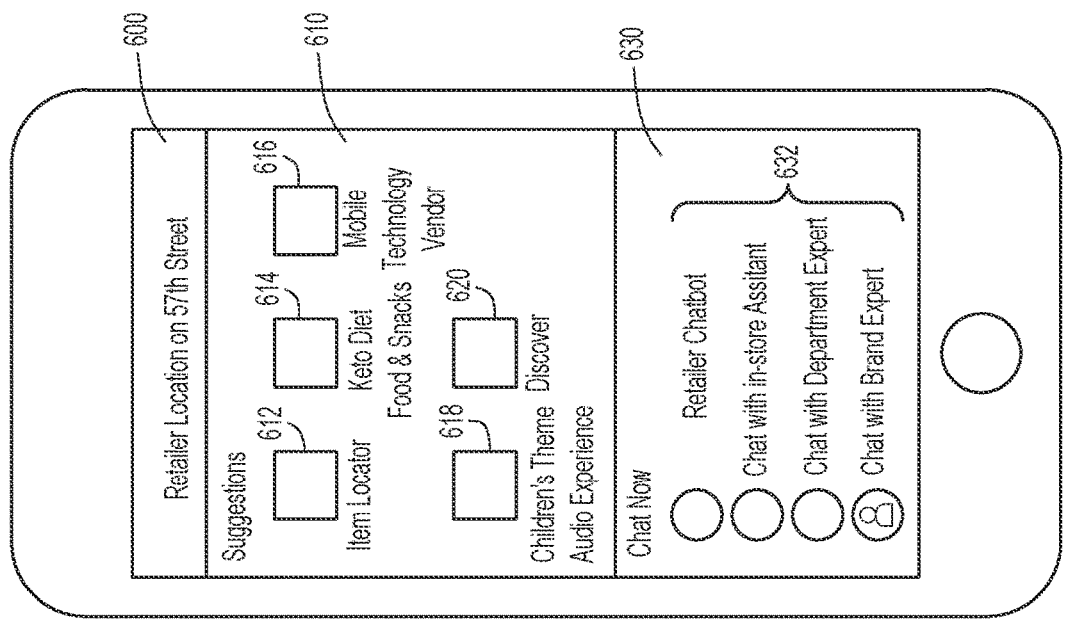
FIG. 6 is a diagram of an example of a user interface screen of a user application installed on a user device that enables user interactions with the contextually relevant and location-aware communication services, according to an example embodiment.

Reference is now made to FIG. 6. FIG. 6 illustrates a user interface screen 600 of the context services user app 152 on a user device of the user (from the example of FIG. 5), examples of the contextual content for the user of FIG. 5 at the retailer's location 57th street in a particular city. In one area of the user interface screen 600, there is a Suggestions space 610 that includes icons for various services including an Item Locator 612, Keto Diet Food & Snacks 614, mobile technology vendor 616, children's theme audio experience 618, and a Discover feature 620. The retailer has selected their most used location-aware service, Item Locator 612, to always appear. Because the user prioritizes Keto diet in her preferences, and the retailer having that already as a category, the Keto Diet Food & Snacks 614 will also appear automatically for this user without the user having prior knowledge that it even existed. The Discover feature 620 triggers a presentation to the user of a wider range of services available at that time and place for the user.

The user interface screen 600 also includes a space 630 displaying chat spaces/services 632 that are available to the user at this location, including:

A retailer chatbot for simple questions.

Chat with an In-store Associate in the same location as the user.

Chat with a Department Expert—someone who is familiar the retailer inventory and experienced in the category like electronics, baby, home, pharmacy, etc.

Chat with a Brand Expert—connect to the brand's customer service department.

The location owner may also permit additional third-party app slice functionality to make the retailer shopping experience more meaningful.

Reference is now made to FIG. 7. FIG. 7 is a diagram 700 that shows how a user's context may shift throughout the day. The user is shown at 705 and the user's device is shown at 707. The user's identity presented to others may vary according to the location of the user and time of day, using the aforementioned Adaptive ID. During work hours, the user 705 may be at his/her workplace 710 where the user creates community and performs other work activities, such as booking conference rooms. At the workplace 710, the Adaptive ID for the user is a "professional" identifier.

In one example, after work, the user 705 may go to a shopping destination/mall 715 where a different experience is provided, such as joining the user with an in-store associate or expert chat session and/or presenting the user with loyalty reward notifications. The Adaptive ID for the user at this venue may be completely anonymous user identifier. After that, the user 705 may go to a public event venue 720 (such as a stadium for a concert or sporting event). At the public event venue 720, the user 705 may be presented with customized experiences to the event as well as dynamic offers. The Adaptive ID for the user at the public event venue 720 may be a semi-anonymous user identifier.

In another scenario, the user 705 may leave his/her workplace 710 and go to the airport 725. At the airport, the user 705 may be presented with interactive indoor maps and real-time flight updates and the user's anonymous user identifier may be used. Further still, the user 705 may go to a University location 730 where the user may be granted access for two-way communication services (for emergencies), presented with information about professor office hours, etc. At the University location 730, the user's Adaptive ID may be a student identifier.

The theme of FIG. 7 is that a user can use one app on his device, go to multiple venues and have numerous different experiences, all of which are driven by the location of the venue, type of venue, user preferences and location/venue preference.

Adaptive ID

As explained above in connection with FIG. 7, each user can set his/her user profile which consist of user configuration information that defines the parameters by which the user can control his/her experience. In one example, the user configuration information may include, for a given user, a plurality of user identifiers, each of which is associated with the given user, along with settings that determine which user identifier of the plurality of user identifiers is displayed on behalf of the respective user in communication sessions according to a geographic location of a mobile device associated with the respective user and/or time of day of the communication sessions. This is the notion of an Adaptive ID. The user configuration information for the given user may cause a different user identifier of the plurality of user identifiers to be displayed on behalf of the first user, together with content that is presented based on preconfigured preferences of the given user that are included in the user's configuration information and associated with a respective user identifier of the plurality of user identifiers for the first user. The user identifier to display on behalf of the given user may depend on venue type of the geographic location of the given user and/or time of day.

The plurality of user identifiers for a given user may include a first (completely) anonymous user identifier to be used for a first type of public venue, a professional identifier to be used for a workplace venue, and a second semi-anonymous user identifier to be used for a second type of public venue for which the first user desires to share preferences for a tailored experience, a student identifier for an educational venue, and so on.

Location-First Browser

Figure 8B:
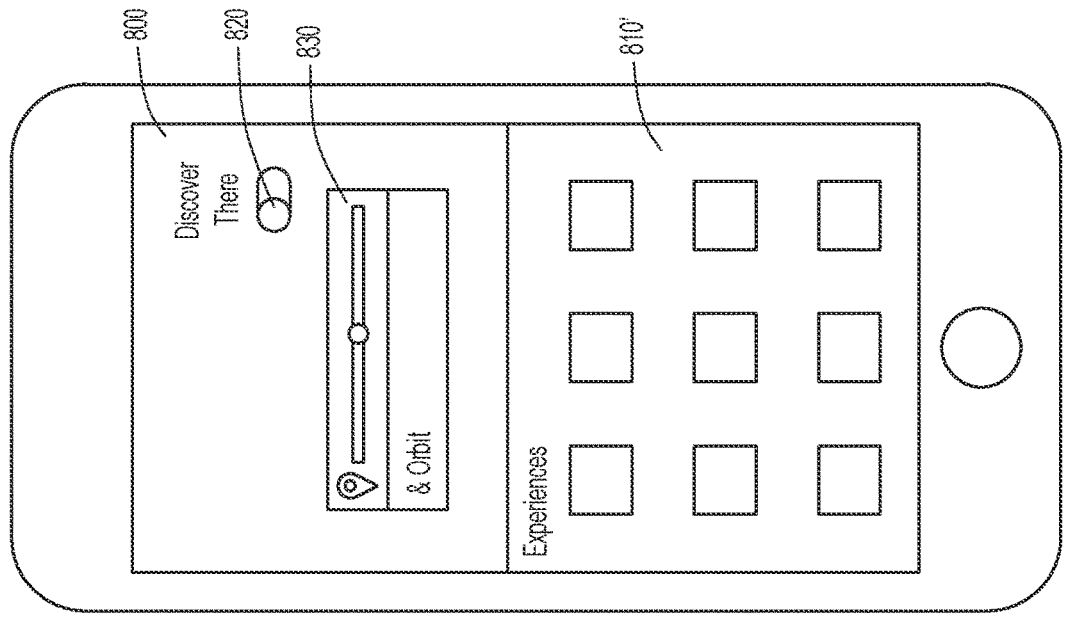
FIGS. 8A and 8B illustrate examples of a user interface screen of the user application installed on a user device, and illustrating further aspects of the contextually relevant and location-aware communication services, according to an example embodiment.
Figure 8A:
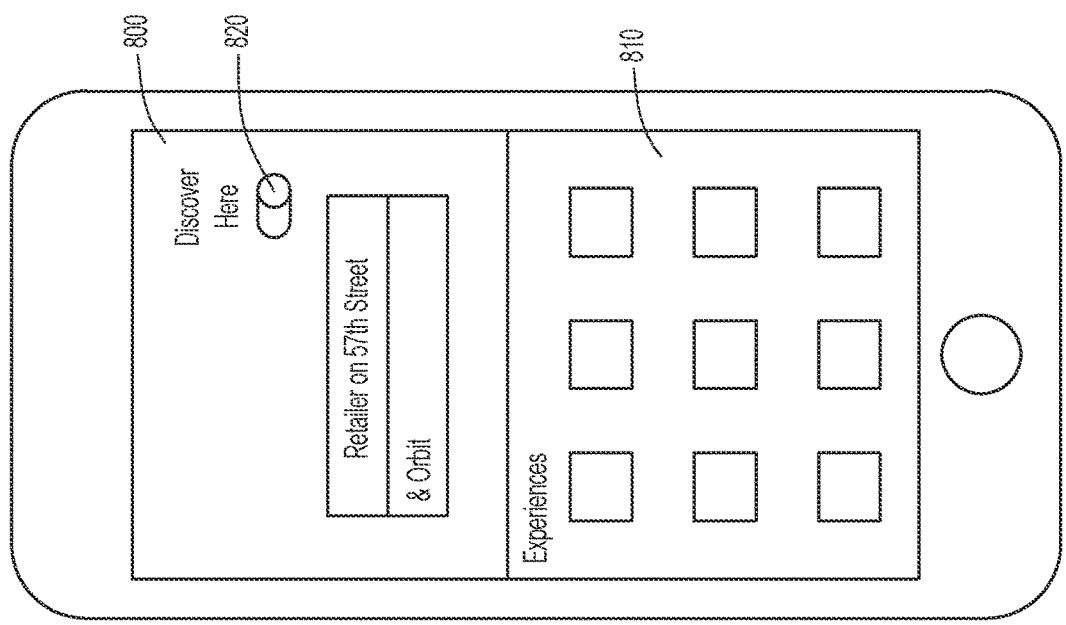

Reference is now made to FIGS. 8A and 8B. FIG. 8A illustrates how the user interface dashboard for the context service user app 152 may be used, according to example embodiments.

Currently a browser search involves a user filling in a word/phrase/question by either typing or by voice. Then a page listing matching pages is returned.

By contrast, the context service user app 152 may be configured to operate as a location-first browser, as the first input of the content presented by the user interface is the location of the user. This location-first browser functionality allows a user to enter a location, either physically or virtually. Then, a display of available actions (communication services) related to environment, time and personal preferences is returned.

The techniques presented herein may serve as an autonomous dynamic agent that can perceive and act, recursively self-improving, The system perceives—by location and user device connection, acts by knowing a user's preferences and delivers the curated experience by the location owner.

The embodiments presented herein enable a user to constrain search results to a location radius as well as factoring in services available right at this moment at this location. The "here" is already pre-filled in. The "&" is to denote a logical AND operation by which the user can search for additional relevant web experiences and information on top of the location. The term "Orbit" is used herein to refer to the location radius around a user for which the user may be presented with a variety of services.

Thus, as shown in FIG. 8A, a user interface 800 is shown in which the user is at a location of a particular Retailer on 57$^{th}$ street. In an Experiences space 810 of the user interface 800, a group of icons are presented that are associated with various communication services that the user can select, similar to that shown in FIG. 6. This may be controlled by a toggle icon 820, where in FIG. 8A, the toggle is set to a "Discovery Here" position, meaning the current location of the user, i.e., at Retailer on 57$^{th}$ street.

As shown in FIG. 8B, the user could then move the toggle icon 820 to "There" and slide a distance user interface element 830 to create a physical radius of their search to determine what services are currently available within the physical radius of the user. As the distance user interface element 830 is moved, the experiences space 810' will change to include icons for additional services that are available in the physical radius. For example, if the user is at the Retailer on 57$^{th}$ street, and moves the toggle icon 820 to "There" and searches for AR experiences, the results page would include other AR experiences in that radius.

Figure 9:
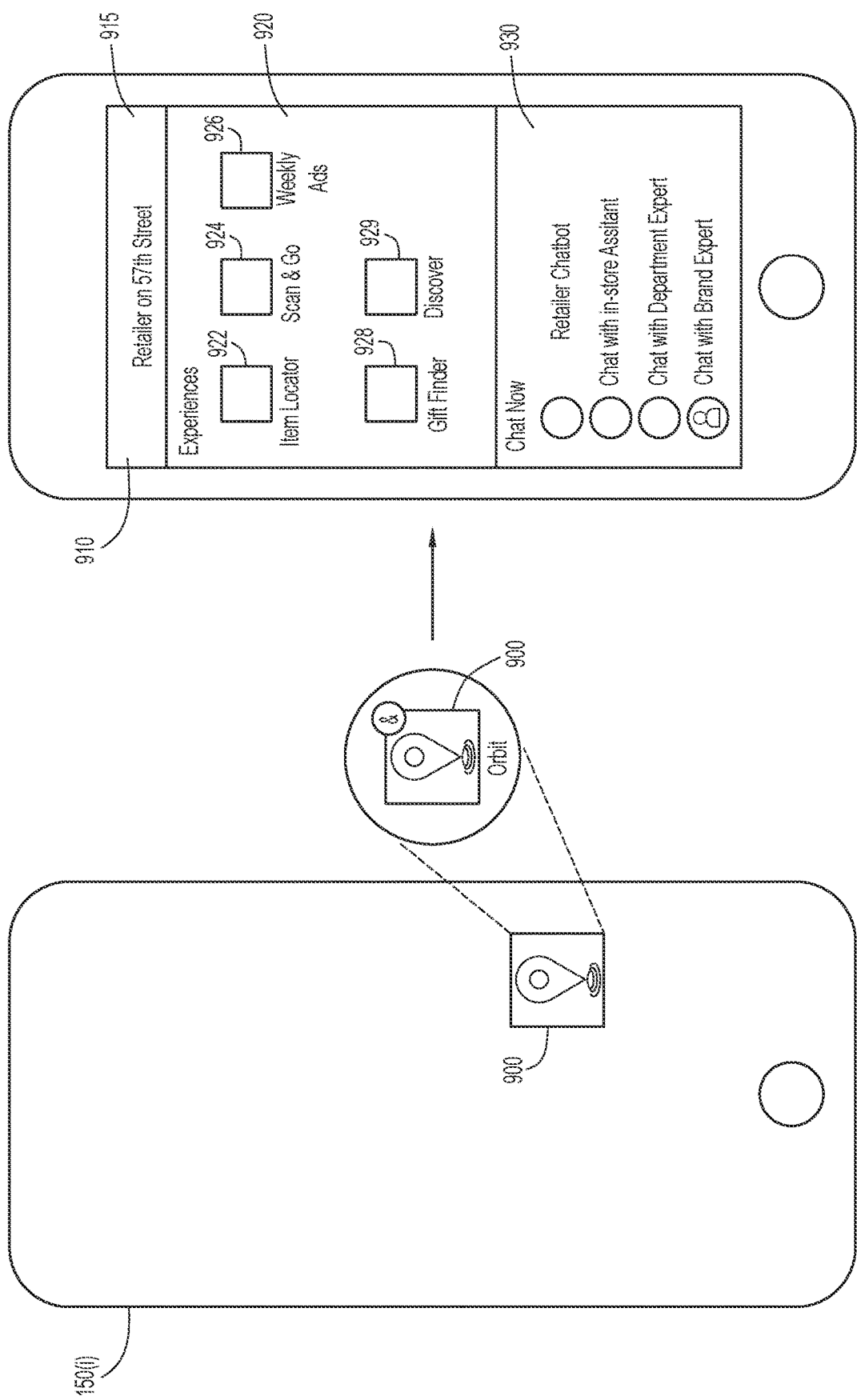
FIG. 9 is a diagram illustrating an example a user icon for the user application installed on a user device, and which can trigger a user interface providing a user access to the contextually relevant and location-aware communication services, according to an example embodiment.

Reference is now made to FIG. 9. FIG. 9 shows a home screen of a user device 150(i), where an icon 900 is included for the context service user app 152, called, as an example Orbit with an ampersand symbol "&". The use of the ampersand may be thought of similar to a hashtag, and serves as a way of organizing information, or a universal symbol on as to what the user can expect. The ampersand symbol is meant to symbolize the underlying techniques presented herein that present services within an "orbit" of a user at a particular time.

When the icon 900 is selected, the user device 150(i) presents the user interface screen 910 (again, for the example in which the user is located at Retailer on 57$^{th}$ street). Space 915 of the screen displays location information of the user. The Experiences space 920 is populated with icons for contextually-aware services associated with the Retailer on 57$^{th}$ street, such as Item Locator 922, Scan&Go 924, Weekly Ads 926, Gift Finder 928, etc. In addition, space 930 displays a list of contextually aware chat services. Consistent/default services displayed in Experiences space 920 include the Discover service 929.

While the foregoing describes the context-based service 110 being accessible via a standalone or dedicated context services user app 152, it is to be understood that the functions of the context-based service 110 may be embedded or integrated within an existing or newly developed collaboration service that is also used for other functions, such as enterprise-based collaboration functions. Further still, the functions of the context-based service 110 may be integrated as a Software Developer Kit (SDK) in a retailer's app (already downloaded onto the user's device) in order to offer the users in-the-moment and hyper-local unique experiences, with the user having to download standalone or dedicated context services user app 152

Virtual Locations

The context-based service described herein may be used even when the "location" is virtual. For instance, while watching a live sporting event from home, a user could participate in focused chat spaces. Furthermore, contextual services, such food delivery specials or multiple camera views of the game may be presented automatically to a user.

Just like the location/venue owners can customize the user experience, the content owners (those presenting the video programming) would do the curation. The user would know this enhanced capability is available through an identifying symbol, such as the "&" symbol, much like closed captioning.

Figure 10:
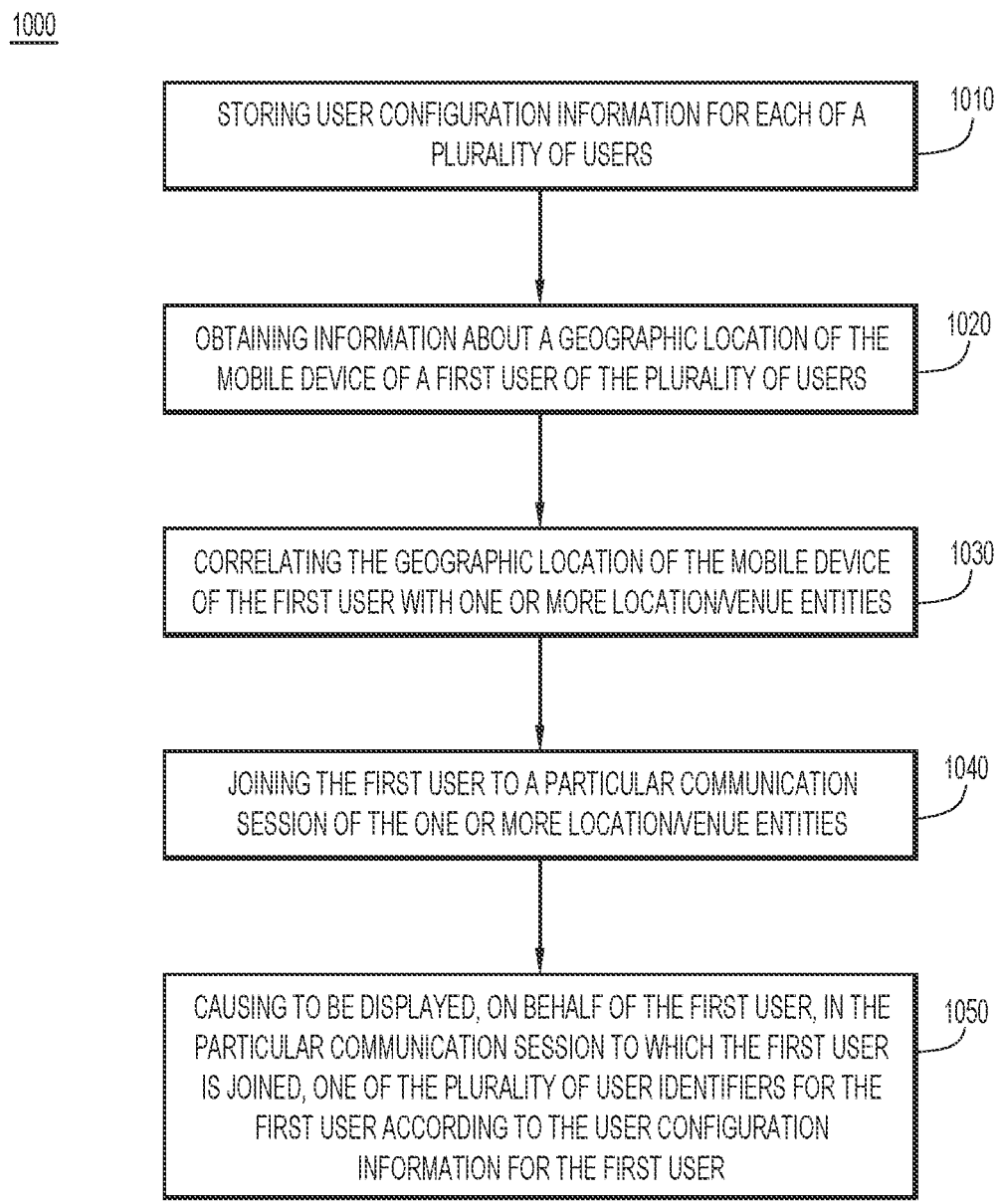
FIG. 10 is a flow chart depicting operations that may be performed by a server configured to support the management and deployment of the contextually relevant and location-aware communication services, according to an example embodiment.

Reference is now made to FIG. 10, which illustrates a flow chart for a method 1000, according to an example embodiment. The method 1000 may be performed by the context-based service 110, shown in FIG. 1, and described above. This method leverages concepts of the Adaptive ID that allow for a user to set which user identifier is presented on his/her behalf in a communication session to which the user is joined at a particular location/venue.

At step 1010, the method includes storing user configuration information for each of a plurality of users. The user configuration information indicates, for one or more users of the plurality of users, a plurality of user identifiers each of which is associated with a respective user of the one or more users, and settings that determine which user identifier of the plurality of user identifiers is displayed on behalf of the respective user in communication sessions on behalf of one or more location/venue entities according to a geographic location of a mobile device associated with the respective user and/or time of day of the communication sessions. Thus, step 1010 concerns establishing some of the basic parameters for the aforementioned Adaptive ID.

At step 1020, the method 1000 includes obtaining information about a geographic location of the mobile device of a first user of the plurality of users.

At step 1030, the method 1000 includes correlating the geographic location of the mobile device of the first user with the one or more location/venue entities.

At step 1040, the method includes joining the first user to a particular communication session based on the correlating step 1030.

At step 1050, the method includes causing to be displayed, on behalf of the first user, in the particular communication session to which the first user is joined, one of the plurality of user identifiers for the first user according to the user configuration information for the first user.

As explained above, the user configuration information for the first user may cause a different user identifier of the plurality of user identifiers to be displayed on behalf of the first user, together with content that is presented based on preconfigured preferences included in the user configuration information associated with a respective user identifier of the plurality of user identifiers for the first user, and further depending on venue type of the geographic location of the mobile device of the first user and/or time of day. For example, the plurality of the user identifiers may include a completely anonymous user identifier for a first type of public venue, a professional identifier for a workplace venue, a student identifier for an educational venue and a semi-anonymous user identifier for a second type of public venue for which the first user desires to share preferences for a tailored experience.

In one form, the particular communication session is at least one of: (a) messaging, chat and video services on a one-to-one or one-to-many basis; or (b) promotional or information communication services. In one example, the particular communication session is a new or existing chat session that is based on the geographic location of the mobile device of the first user.

The method 1000 may, in one form, include removing the first user from the particular communication session based on a change in the geographic location of the mobile device of the first user. Similarly, method 1000 may further include terminating the particular communication session based on an event trigger, such as terminating a chat bot or other chat session between the first user and another party based upon the first user changing geographic locations.

As described above, the user configuration information for respective users of the plurality of users may further include interest information indicating topical interests of the respective users. Further still, the user configuration information may specify user preferences and permissions for participation in communication sessions of the one or more location/venue entities. Accordingly, the correlation step 1030 may include determining a match between configurations set by the one or more location/venue entities and the interest information included in the user configuration information for the first user.

Furthermore, as explained above, the communication sessions may include publically accessible content (e.g., retail, events, etc.) as well as privately accessible content requiring user authentication prior to access (e.g., corporate or enterprise chat sessions/spaces).

As described above in connection with FIG. 2, step 1010 of method 1000 may further include storing for each of the one or more location/venue entities, configuration information associated with content to be presented to, and communication sessions to be provided for, the plurality of users based on customization and preferences set by respective location/venue entities.

Further still, as described in connection with FIG. 3B, the method 1000 may further include operations to allow a user to maintain his/her anonymity when joined to a communication session at a location/venue. In the context of method 1000, this may involve steps of: presenting a prompt to the first user to be joined to the particular communication session with an anonymous or modified user identity that does not reveal the real identity of the first user; and based on the prompt, receiving from the first user a selection to join the first user to the particular communication session with the anonymous or modified user identity.

There are numerous advantages to the system and methods presented herein.

Discovery-as-a-Service

Methodologies are provided herein for liberating the relevant functionality from the app and surfacing them automatically to the user. This greatly streamlines the awareness of location interactivity.

New ways are provided to syndicate isolated app functionality separate from the complete app. Relevant app slice functionality can come from the venues own app or combined with third-party app slices.

A contextual feed is enabled by these techniques. By extracting just the desired app slice functionality from the app, the user enjoys real-time multi-app usage without the friction of searching for and downloading multiple apps.

The Discover feature and recommendation engine described herein provides for more exposure to adjacent experiences that may not be known or are available on an app store. The techniques presented herein provides for a novel distribution channel that has the potential to become the primary source for location-based app discovery and interaction. The syndication of app slice functionalities reduces the amount of time to get the user the exact capability the user needs, along with a user experience that makes it feel seamless.

Geographical, Category or Group Segmentation

The embodiments presented herein provide for the ability to segment a location using zones to interact with a user precisely and dynamically. A location/venue owner/entity administrator can predetermine a dynamic messaging/super-agents ecosystem. This enables a direct-to-consumer touchpoint and easy on-ramp for a long-term digital customer relationship even if the user never downloads the location/venue entity's app.

A user controlled pop-up social networking feature is provided by which a user can chat with others in the same location, without being previously connected, with an ID of their choosing. The chat space may disappear after the event.

A Quality of Position function is provided that ensures that the user is receiving truly contextual services in areas of high-congestion.

Ownership of the Experience

An administrator for a location/venue owner/entity can predetermine a dynamic messaging/super-agents ecosystem and curate the digital services. This enables a direct-to-consumer touchpoint and easy on-ramp for a long-term digital customer relationship even if the end-user never downloads the venue's complete app.

The user is control of identity, privacy, and personalization.

Digital Shelf Space

The system and methods presented herein may be considered as a way to create a new marketplace for location owners. It is analogous to adding more shelving in a retail store or another floor in a stadium. The venue owners to determine what inventory is on those shelves or what restaurants should be on the new stadium floor.

This expands the market for brands as the creation of a digital shelf provides a vehicle for interactive experiences, such as AR, to be consumed.

Universal Interface and Framework

The system and methods presented herein provide a universal framework and platform for interactions within a location. This involves one download and multiple venues. A consistent user experience is achieved for two-way communication when it comes to people around the user as well as customer service and interaction with location services.

The federation of locations, Adaptive ID, and a reusable interest graph enables one time set-up for user to automatically connect at participating locations throughout the day to allow for personalized experiences. Furthermore, the user interface of the location-feed provides a mechanism and shell for a location-first browser.

Day Two Advantages

The system and methods provide for "Experience" lists which may be similar to the playlist concept. Experiences can be "left" to be discovered by others, celebrity curated, or users can make lists and share them with friends.

In summary, as a user's context shifts throughout the day (from work to shopping to entertainment, etc.) tools are needed that can adapt to filter the content differently based on what the user may care about at a particular moment when the user is at a particular venue. The system and methods presented herein provides for a contextual-based, pop-up social platform that is both public and private.

The automatic creation and deletion of an ephemeral space/channel provides a dynamic app that changes its content or behavior based on a user's location. The user controls the interactivity level based on the Adaptive ID concepts described herein, which also leverage the Quality of Position as well as user permissions and preferences. These are the triggers that unlock contextual experiences by the location owner.

As a location-services feed management system, the system and method provides for an automatic universal location user interface that includes dynamic cards as well as the invention of a location-first browser. The interplay of the location owner curation and the user's preferences and interests achieves experiences that are more technically efficient and fruitful.

Figure 11:
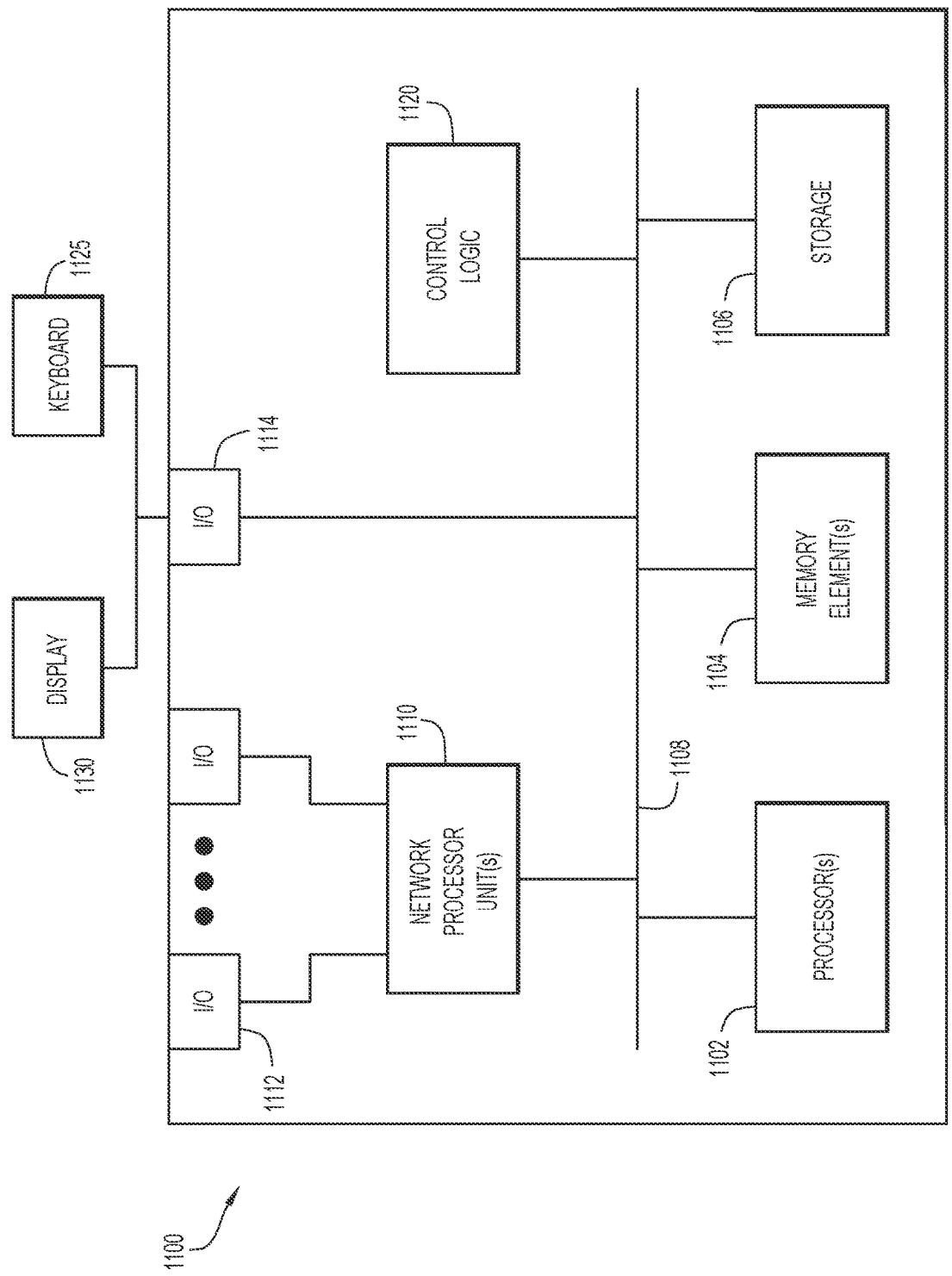
FIG. 11 is a hardware block diagram of computer device that may be configured to perform the functions of a user device, according to an example embodiment.

Referring to FIG. 11, FIG. 11 illustrates a hardware block diagram of a computing/computer device 1100 that may perform functions associated with a user device in the techniques depicted in FIGS. 1, 2, 3A, 3B, 4-7, 8A, 8B, 9 and 10.

In at least one embodiment, the computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein. The control logic 1120 may include instructions for the aforementioned context service user app 152 (FIG. 1) and any other associated operating system and application software functionality that may run on a user device.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory element(s) 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 (wired and/or wireless) to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, any other I/O port(s), and/or antenna(s)/antenna array(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computer device 1100. For example, I/O interface(s) 1114 may provide a connection to external devices such as a keyboard 1125, keypad, a touch screen, and/or any other suitable input and/or output device now known or hereafter developed. This may be the case, in particular, when the computer device 1100 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 1130 shown in FIG. 11, particularly when the computer device 1100 serves as a user device as described herein. Display 1130 may have touch-screen display capabilities.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory element(s) 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 12:
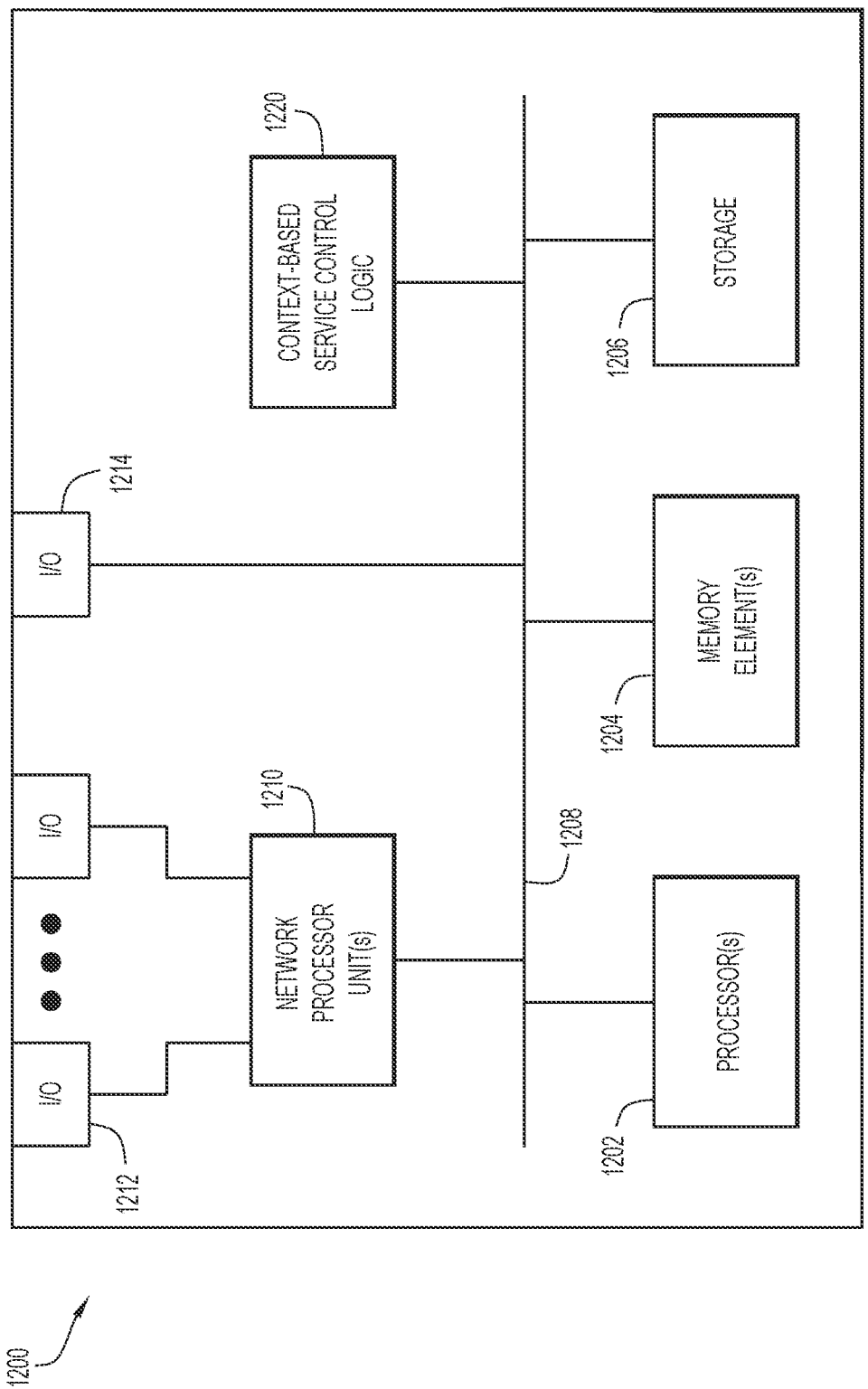
FIG. 12 is a hardware block diagram of a computer device that may be configured to perform the functions of a server configured to support the management and deployment of the contextually relevant and location-aware communication services, according to an example embodiment.

FIG. 12 illustrates an example of a block diagram of a computing device 1200 that may be configured to perform the functions of the context-based service 110 referred to above. The computing device 1200 may be embodied by one or more server computers. In at least one embodiment, the computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein. The control logic 1220 may include instructions, that when executed by the one or more processors, cause the computing device 1200 to perform the operations of the context-based service 110 presented herein.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, conversation is central to the chat experience, but messages do more than just communicate. With the need for more user convenience targeted these days, techniques are provided for a non-intruding auto quoting feature on-the-fly for chat applications based on previous conversations and effectively forking/quoting such conversations to ease the burden of the user going through all the chat history. The fork will not change a user's existing content instead it will help you with the viable options which can be utilized or ignored if the user thinks it is not needed. The privacy and trust remains the same as this solution explicitly uses the data that is available as part of the user chat history and it never crosses the boundary.

In one form, A method is provided comprising: storing user configuration information indicating, for one or more users of a plurality of users, a plurality of user identifiers each of which is associated with a respective user of the one or more users, and settings that determine which user identifier of the plurality of user identifiers is displayed on behalf of the respective user in communication sessions on behalf of one or more location/venue entities according to a geographic location of a mobile device associated with the respective user and/or time of day of the communication sessions; obtaining information about a geographic location of the mobile device of a first user of the plurality of users; correlating the geographic location of the mobile device of the first user with the one or more location/venue entities; joining the first user to a particular communication session based on the correlating; and causing to be displayed, on behalf of the first user, in the particular communication session to which the first user is joined, one of the plurality of user identifiers for the first user according to the user configuration information for the first user.

In another form, an apparatus is provided comprising: An apparatus comprising: a network interface configured to enable network communications; a memory; and one or more processors coupled to the network interface and memory, wherein the one or more processors are configured to perform operations including: storing in the memory, user configuration information indicating, for one or more users of a plurality of users, a plurality of user identifiers each of which is associated with a respective user of the one or more users, and settings that determine which user identifier of the plurality of user identifiers is displayed on behalf of the respective user in communication sessions on behalf of one or more location/venue entities according to a geographic location of a mobile device associated with the respective user and/or time of day of the communication sessions; obtaining information about a geographic location of the mobile device of a first user of the plurality of users; correlating the geographic location of the mobile device of the first user with the one or more location/venue entities; joining the first user to a particular communication session based on the correlating; and causing to be displayed, on behalf of the first user, in the particular communication session to which the first user is joined, one of the plurality of user identifiers for the first user according to the user configuration information for the first user.

In another form, one or more non-transitory computer readable storage media are provided encoded with instructions that, when executed by a processor, cause the processor to perform operations including: storing user configuration information indicating, for one or more users of a plurality of users, a plurality of user identifiers each of which is associated with a respective user of the one or more users, and settings that determine which user identifier of the plurality of user identifiers is displayed on behalf of the respective user in communication sessions on behalf of one or more location/venue entities according to a geographic location of a mobile device associated with the respective user and/or time of day of the communication sessions; obtaining information about a geographic location of the mobile device of a first user of the plurality of users; correlating the geographic location of the mobile device of the first user with the one or more location/venue entities; joining the first user to a particular communication session based on the correlating; and causing to be displayed, on behalf of the first user, in the particular communication session to which the first user is joined, one of the plurality of user identifiers for the first user according to the user configuration information for the first user.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   storing user configuration information indicating, for one or more users of a plurality of users, a plurality of user identifiers each of which is associated with a respective user of the one or more users, and settings that determine which user identifier of the plurality of user identifiers is displayed on devices of one or more other users in communication sessions on behalf of one or more location/venue entities according to a geographic location of a mobile device associated with the respective user and/or time of day of the communication sessions;

obtaining information about a geographic location of the mobile device of a first user of the plurality of users;

correlating the geographic location of the mobile device of the first user with the one or more location/venue entities;

joining the first user to a particular communication session based on the correlating; and causing to be displayed on devices of one or more other users in the particular communication session to which the first user is joined, one of the plurality of user identifiers for the first user according to the user configuration information for the first user, wherein the user configuration information for the first user causes a different user identifier of the plurality of user identifiers of the first user to be displayed on devices of one or more other users in the particular communication session depending on venue type of the geographic location of the mobile device of the first user and/or time of day.

2. The method of claim 1, wherein the user configuration information for the first user further causes content to be presented based on preconfigured preferences included in the user configuration information associated with a respective user identifier of the plurality of user identifiers for the first user.

3. The method of claim 2, wherein the plurality of user identifiers includes a completely anonymous user identifier for a first type of public venue, a professional identifier for a workplace venue, a student identifier for an educational venue and a semi-anonymous user identifier for a second type of public venue for which the first user desires to share preferences for a tailored experience.

4. The method of claim 1, wherein the particular communication session is at least one of: (a) messaging, chat and video services on a one-to-one or one-to-many basis; or (b) promotional or information communication services.

5. The method of claim 1, wherein the particular communication session is a new or existing chat session that is based on the geographic location of the mobile device of the first user.

6. The method of claim 1, further comprising:
removing the first user from the particular communication session based on a change in the geographic location of the mobile device of the first user.

7. The method of claim 1, further comprising:
terminating the particular communication session based on an event trigger.

8. The method of claim 1, wherein the user configuration information for respective users of the plurality of users further includes interest information indicating topical interests of the respective users.

9. The method of claim 8, wherein correlating further comprises determining a match between configurations set by the one or more location/venue entities and the interest information included in the user configuration information for the first user.

10. The method of claim 9, wherein the user configuration information further specifies user preferences and permissions for participation in communication sessions of the one or more location/venue entities.

11. The method of claim 1, wherein the communication sessions include publicly accessible content and privately accessible content requiring user authentication prior to access.

12. The method of claim 1, wherein storing further comprises storing for each of the one or more location/venue entities, configuration information associated with content to be presented to, and communication sessions to be provided for, the plurality of users based on customization and preferences set by respective location/venue entities.

13. The method of claim 1, further comprising:
presenting a prompt to the first user to be joined to the particular communication session with an anonymous or modified user identity that does not reveal a real identity of the first user; and
based on the prompt, receiving from the first user a selection to join the first user to the particular communication session with the anonymous or modified user identity.

14. An apparatus comprising:
a network interface configured to enable network communications;
a memory; and
one or more processors coupled to the network interface and memory, wherein the one or more processors are configured to perform operations including:
storing in the memory, user configuration information indicating, for one or more users of a plurality of users, a plurality of user identifiers each of which is associated with a respective user of the one or more users, and settings that determine which user identifier of the plurality of user identifiers is displayed on devices of one or more other users in communication sessions on behalf of one or more location/venue entities according to a geographic location of a mobile device associated with the respective user and/or time of day of the communication sessions;
obtaining information about a geographic location of the mobile device of a first user of the plurality of users;
correlating the geographic location of the mobile device of the first user with the one or more location/venue entities;
joining the first user to a particular communication session based on the correlating; and
causing to be displayed on devices of one or more other users in the particular communication session to which the first user is joined, one of the plurality of user identifiers for the first user according to the user configuration information for the first user,
wherein the user configuration information for the first user causes a different user identifier of the plurality of user identifiers of the first user to be displayed on devices of one or more other users in the particular communication session depending on venue type of the geographic location of the mobile device of the first user and/or time of day.

15. The apparatus of claim 14, wherein the user configuration information for the first user further causes content to be presented based on preconfigured preferences included in the user configuration information associated with a respective user identifier of the plurality of user identifiers for the first user.

16. The apparatus of claim 15, wherein the plurality of user identifiers includes a completely anonymous user identifier for a first type of public venue, a professional identifier for a workplace venue, a student identifier for an educational venue and a semi-anonymous user identifier for a second type of public venue for which the first user desires to share preferences for a tailored experience.

17. The apparatus of claim 14, wherein the particular communication session is a new or existing chat session that is based on the geographic location of the mobile device of the first user, and wherein the one or more processors are configured to remove the first user from the particular communication session based on a change in the geographic location of the mobile device of the first user.

18. One or more non-transitory computer readable storage media encoded with instructions that, when executed by a processor, cause the processor to perform operations including:
- storing user configuration information indicating, for one or more users of a plurality of users, a plurality of user identifiers each of which is associated with a respective user of the one or more users, and settings that determine which user identifier of the plurality of user identifiers is displayed on devices of one or more other users in communication sessions on behalf of one or more location/venue entities according to a geographic location of a mobile device associated with the respective user and/or time of day of the communication sessions;
- obtaining information about a geographic location of the mobile device of a first user of the plurality of users;
- correlating the geographic location of the mobile device of the first user with the one or more location/venue entities;
- joining the first user to a particular communication session based on the correlating; and
- causing to be displayed on devices of one or more other users in the particular communication session to which the first user is joined, one of the plurality of user identifiers for the first user according to the user configuration information for the first user,
- wherein the user configuration information for the first user causes a different user identifier of the plurality of user identifiers of the first user to be displayed on devices of one or more other users in the particular communication session depending on venue type of the geographic location of the mobile device of the first user and/or time of day.

19. The one or more non-transitory computer readable storage media of claim 18, wherein the user configuration information for the first user further causes content to be presented based on preconfigured preferences included in the user configuration information associated with a respective user identifier of the plurality of user identifiers for the first user.

20. The one or more non-transitory computer readable storage media of claim 19, wherein the plurality of user identifiers includes a completely anonymous user identifier for a first type of public venue, a professional identifier for a workplace venue, a student identifier for an educational venue and a semi-anonymous user identifier for a second type of public venue for which the first user desires to share preferences for a tailored experience.

\* \* \* \* \*